US006539635B2

(12) United States Patent
Lehmann et al.

(10) Patent No.: US 6,539,635 B2
(45) Date of Patent: Apr. 1, 2003

(54) CHAIN SAW WITH SAW DEPTH LIMITATION

(75) Inventors: Rolf Lehmann, Hamburg (DE); Björn Buller, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/909,458

(22) Filed: Jul. 19, 2001

(65) Prior Publication Data

US 2002/0026716 A1 Mar. 7, 2002

(30) Foreign Application Priority Data

Aug. 14, 2000 (DE) ........................................ 200 14 205

(51) Int. Cl.[7] ................................................ B23B 57/02
(52) U.S. Cl. ............................................. 30/371; 30/383
(58) Field of Search .......................... 30/371, 381, 383, 30/384, 385; 83/745

(56) References Cited

U.S. PATENT DOCUMENTS 3,092,156 A * 6/1963 Hayden ....................... 30/371

* cited by examiner

*Primary Examiner*—Douglas D. Watts

(57) ABSTRACT

To limit the penetration of the outer end of a chain saw into a material being cut by the saw, the chain carrying rail of the saw has a number of uniformly sized holes located at different points along its length into any selected one of which holes a limiting means can be placed, with the limiting means including two rotatable wheels located on opposite sides of the rail.

9 Claims, 1 Drawing Sheet

CHAIN SAW WITH SAW DEPTH LIMITATION

For cuts in thin materials with a sheet thickness up to several centimeters, due to the oscillations and the coarse movement of the saw chain, a motor saw (chain saw) can be guided safely only with an increased expenditure of force and attention.

When cutting thin materials such as, for example, a vapour barrier or a sheet wall, especially with carbide tipped saw chains, the user cannot see the space lying behind the cut and can thus run into dangerous situations or destroy the saw chain, particularly in the life-saving service (fire brigade, technical welfare organization etc.) due to the damage of lines or objects.

By deeply immerging rail points, third parties which are in the danger zone, can be endangered. This is valid for example when the fire brigade opens a flat roof for rescue parties which are in the space below.

In particular, the fire brigade thus wishes a depth limiter for motor saw works during the rescue service.

Different configurations of depth limiters for motor saws are already known by the prior art. So, for example the problem of the depth limitation of the motor saw type 046 HDR of the STIHL company is solved by a displaceable cover with a rounded front opening. Similar solutions are also known from U.S. Pat. No. 5,435,065, U.S. Pat. No. 5,156,156 and U.S. Pat. No. 4,833,781.

The disadvantage of these known depth limiters is the comparatively high construction expenses which simultaneously causes a considerable increase in weight of the saw as well as the sensitivity of the adjusting mechanism.

Thus, the aim of the invention is to create a chain saw with an adjustable depth limiter which has a comparatively light and simple construction, which is simple and safe to operate and which is characterized by its robustness when in service.

The aim is reached by the whole characteristics of claim 1. The heart of the invention is a lengthwise adjustable wheelset which is fixed to the rail of the chain saw with at least respectively one running wheel on both sides of the rail. In the proposed solution, the running wheels fixed on the left and on the right of the rail take over the function of the depth limitation and of the stop for absorbing the tensile forces developed by the saw chain.

The depth limiter according to the invention is particularly simple and robust if, according to a preferred configuration of the invention, a multitude of holes are placed the one behind the other in the longitudinal direction for adjusting the wheelset in the rail and if the wheelset is dismountable in several parts which can be connected the one with the other through one of the holes in such a way that the wheelset is fixed on the respective hole.

Preferably, the parts of the wheelset comprise a first flange situated parallel to the rail with a first wheel bearing for receiving the first running wheel and a second flange situated parallel to the rail for receiving the second running wheel. A bush which is perpendicular to the flange for passing through the hole in the rail is placed on one of the flanges, while the other flange has a corresponding bore hole for receiving the bush.

There results a quick and simple fixation of the wheelset on the rail when a collapsible bolt which can be put through both flanges is provided for connecting the parts, whereby this bolt can be tensioned by means of a tensioning device and which fixes when tensioned the wheelset on the rail, the tensioning device preferably comprising a manually actuatable eccentric clamp.

Further configurations of the chain saw according to the invention result from the dependent claims.

The invention will be explained in more detail below with reference to the embodiments represented in the attached drawings.

Figure 1:
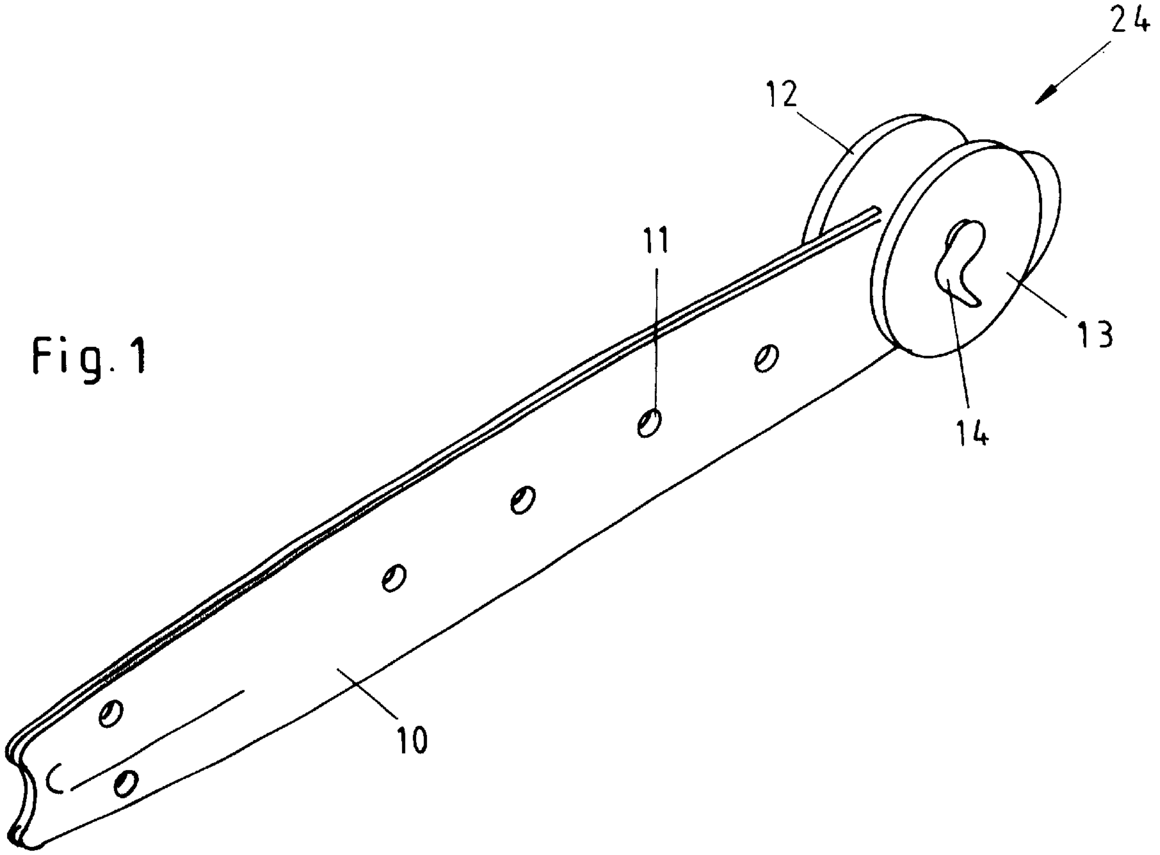
FIG. 1 is a perspective side view of a rail (without saw chain) with a depth limitation in form of a wheelset according to a preferred embodiment of the invention.

FIG. 1 is a perspective side view in which a rail with a depth limitation in form of a wheelset according to a preferred embodiment of the invention is represented. To simplify, the motor drive and the saw chain of the chain saw are not represented. The rail 10 is fixed with the left end on the saw. The right end is the point of the rail 10 which is used to saw grooves or to execute depth limited cuts.

A wheel set 24 which comprises two running wheels 12 and 13 which are rotatably placed inside the wheelset 24 respectively on one side of the rail 10 is fixed on the rail as a depth limitation for the saw depth. The divisible wheelset 24 is fixed on the rail 10 respectively on one of several holes 11 which are placed spaced from each other the one behind the other in the longitudinal direction of the rail 10. The distance of the holes 11 in the row of holes can be equidistant and so make possible an uniform gradual adjustability. The wheelset 24 assembled through one of the holes can be fixed quickly and safely on the rail 10 manually by means of an eccentric clamp 14.

Figure 2:
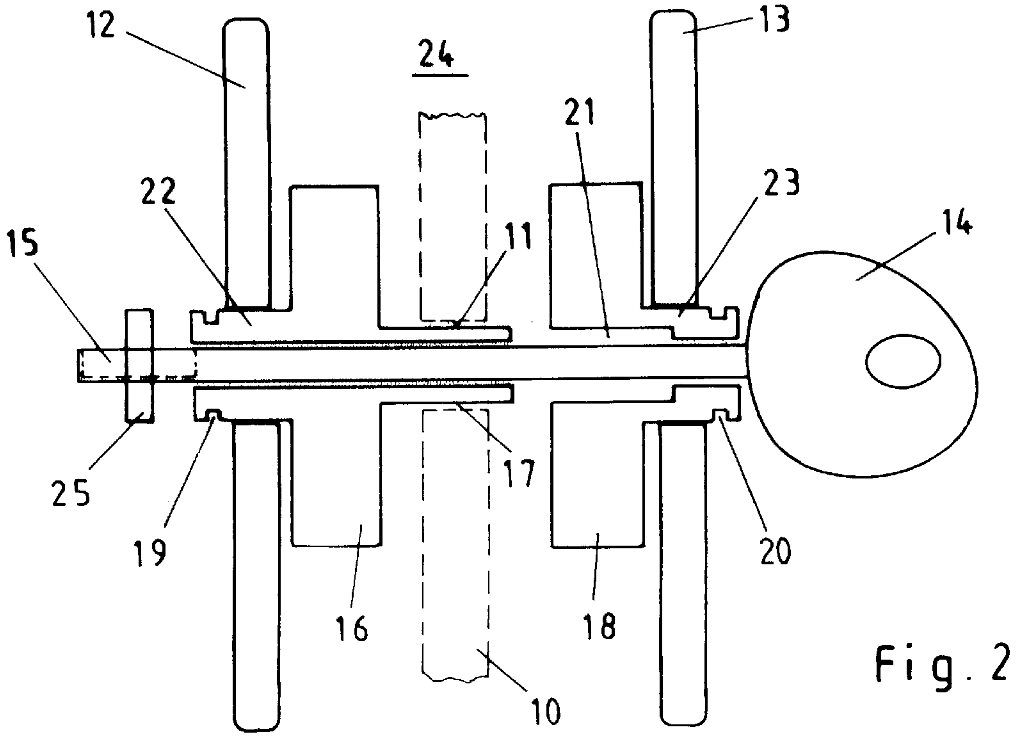
FIG. 2 is a longitudinal section through a wheelset according to FIG. 1 when mounted on the rail.

The wheelset 24 is preferably constituted according to FIG. 2. It consists of two flanges 16 and 18 on which a rad bearing 22 or 23 is moulded respectively to the outside for the bedding of a running wheel 12 or 13. The spherically turned running wheels 12, 13 are secured on the wheel bearings 22, 23 by (non represented) snap rings which are placed into corresponding grooves 19, 20. Both flanges 16, 18 held the running wheels 12, 13 at a sufficient distance of the saw chain rotating about the rail 10 and simultaneously serve as clamping jaws for the fixing of the wheelset 24. A bush 17 is moulded on the left flange 16 on the inside, the outer diameter of which is chosen such that it can be stuck with a sufficient play through one of the holes 11. The right flange 18 has a corresponding bore hole 21 for receiving the bush 17. Both flanges 16, 18 are pressed with their inner sides against the rail 10, a collapsible bolt 25 being stuck through central bore holes in the flanges 16, 18, secured by the revolving around an axis of the collapsible element 25 and tensioned by means of the eccentric clamp 14. For adjusting the wheelset 24, inversely the tensioning device 14, 15, 25 is loosened, the wheelset 24 divided and removed from the hole 11 and assembled again in a selected other hole of the row of holes and tensioned.

Due to the row of holes in the rail 10, the wheelset 24 can be adjusted and thus the depth varied. Moreover, the depth of contact of the rail 10 is influenced by the angle of inclination of the saw. The wheelset 24 is preferably fixed in such a way that, in the furthest positioned position to the rail point and for a slight inclination of the motor saw, uniform grooves can be put in in the width of the saw chain. For a quick change, the wheelset 24 is constructed in such a way that the running wheels 12, 13 and the flanges 16, 18 are held together by a snap ring and that they are to be fixed on the rail 10 safe against vibrations with the eccentric clamp 14 with a handle.

The solution according to the invention consists of only a few components, the running wheels 12, 13 are preferably made of light metal. With approximately 300 g, the ready wheelset 24 is considerably lighter than known depth limiters which weigh several kg.

Altogether, the following advantages result from the invention:

Achievement of a depth of cut accurate to the millimeter for protecting the saw chain and third parties;

Least frictional resistance due to spherically turned running wheels;

Straight cuts since the rail is always guided at a right angle to the cut;

Cuts in thin material can be executed quickly and precisely with a low expenditure of force and attention;

Considerably lighter solution than for the known depth limiters.

LIST OF REFERENCE NUMERALS

| | |
|---|---|
| 10 | Rail (saw chain) |
| 11 | Hole |
| 12, 13 | Running wheel |
| 14 | Eccentric clamp |
| 15 | Collapsible bolt |
| 16, 18 | Flange |
| 16 | Bush |
| 19, 20 | Groove (snap ring) |
| 22 | Bore hole |
| 22, 23 | Wheel bearing |
| 24 | Wheel set |
| 25 | Collapsible element (collapsible bolt) |

What is claimed is:

1. A chain saw with a saw chain rotating around a rail (10) for which a device (24) for the adjustable limitation of the saw depth is placed on the rail (10), characterized in that the device comprises a wheelset (24) with at least one rotatably arranged running wheel (12, 13) on each side of the rail (10), for rotation about an axis common to the wheels and perpendicular to and passing through the rail, and adjustment means allowing the wheelset to be selectably placed at any one of a number of different positions in the longitudinal direction of the rail (10).

2. A chain saw according to claim 1, characterized in that the adjustment means includes a multitude of holes (11) spaced one behind the other in the rail (10), and the wheelset (24) has several parts (12, 16, 22 or 13, 18, 23), which parts (12, 16, 22, 13, 18 23) are dismoutable from one of said holes and are remoutable with a selected one of the holes in such a way that the wheelset (24) is fixed on the selected hole (11).

3. A chain saw according to claim 2, characterized in that the parts of the wheelset comprise a first flange (16) situated parallel to the rail (10) with a first wheel bearing (22) for receiving the first running wheel (12) and a second flange (18) situated parallel to the rail (10) with a second wheel bearing (23) for receiving the second running wheel (13), that a bush (17) perpendicular to the flange is placed on one of the flanges (16, 18) for passing through the hole (11) in the rail (10) and that the other flange has a corresponding bore hole (21) for receiving the bush (17).

4. A chain saw according to claim 3, characterized in that for connecting the parts (12, 16, 22 or 13, 18, 23) one collapsible bolt (15) which can be put through both flanges (16, 18) is provided for, whereby this bolt can be tensioned by means of a tensioning device (14) and, when it is in the tensioned state, fixes the wheelset (24) on the rail (10).

5. A chain saw according to claim 4, characterized in that the tensioning device comprises a manually actuatable eccentric clamp (14).

6. A chain saw according to claim 3, characterized in that the running wheels (12, 13) are secured on the respective wheel bearings (22, 23) by means of snap rings.

7. A chain saw according to claim 1, characterized in that the running wheels (12, 13) have circumferential surfaces of spherical shape.

8. A chain saw according to claim 1, characterized in that the running wheels (12, 13) are made of a light metal.

9. A chain saw according to claim 1, characterized in that the number of different positions at which the wheelset can be selectively placed includes a grooving position near the outer end of the rail at which grooving position the wheelset limits the penetration of the saw chain to a depth suitable for cutting uniform grooves in the material being cut.

* * * * *